United States Patent [19]

Coombs

[11] Patent Number: 4,952,101

[45] Date of Patent: Aug. 28, 1990

[54] APPARATUS AND METHOD FOR ALIGNMENT OF DRILLING HOLES AND ASSEMBLY OF CABINETS

[75] Inventor: Donald W. Coombs, Tucson, Ariz.

[73] Assignee: Donald E. Coombs, Trevor, Wis.

[21] Appl. No.: 254,177

[22] Filed: Oct. 5, 1988

[51] Int. Cl.⁵ .............................................. B23B 49/02
[52] U.S. Cl. ............................ 408/115 R; 408/115 B; 408/72 B; 408/241 B; 33/667
[58] Field of Search ............. 408/72 R, 72 B, 115 R, 408/115 B, 241 B, 241 G, 241 S, 103, 108, 109; 33/666, 667, 638

[56] References Cited

U.S. PATENT DOCUMENTS

| | | | |
|---|---|---|---|
| 2,203,992 | 6/1940 | Lutz | 33/667 |
| 2,842,860 | 7/1958 | Gray | 33/667 |
| 3,026,748 | 3/1962 | Comorau | 408/115 R X |
| 3,046,818 | 7/1962 | Saha | 408/103 |
| 3,583,823 | 6/1971 | Eaton | 408/115 A |
| 4,054,396 | 10/1977 | Cassidy | 408/115 R X |
| 4,194,861 | 3/1980 | Keller | 408/109 |
| 4,257,166 | 3/1981 | Barker et al. | 408/115 B X |
| 4,579,485 | 4/1986 | Connor et al. | 408/115 R |
| 4,791,732 | 12/1988 | Bruno, Jr. et al. | 33/667 X |

FOREIGN PATENT DOCUMENTS

| | | | |
|---|---|---|---|
| 2252971 | 10/1972 | Fed. Rep. of Germany | 408/115 R |
| 2912605 | 3/1979 | Fed. Rep. of Germany | 408/115 A |
| 1401716 | 7/1975 | United Kingdom | 408/115 R |
| 2203069 | 10/1988 | United Kingdom | 408/115 R |

OTHER PUBLICATIONS

Horii et al., "A New Configuration of CCD Imager with a Very Low Smear Level—FIT-CCD Imager", IEEE Transactions on Electron Devices, vol. ED-31, No. 7, Jul. 1984, pp. 904-909.

*Primary Examiner*—Z. R. Bilinsky
*Assistant Examiner*—R. Schultz
*Attorney, Agent, or Firm*—Cahill, Sutton & Thomas

[57] ABSTRACT

A number of drill guides are provided for quickly setting up to drill construction holes, door handle holes, hinge holes, and drawer front panel attachment holes for construction of cabinets without excessive jigging setup time. Several tools are described for quickly squaring up cabinet panels and clamping them together while glue dries.

5 Claims, 5 Drawing Sheets

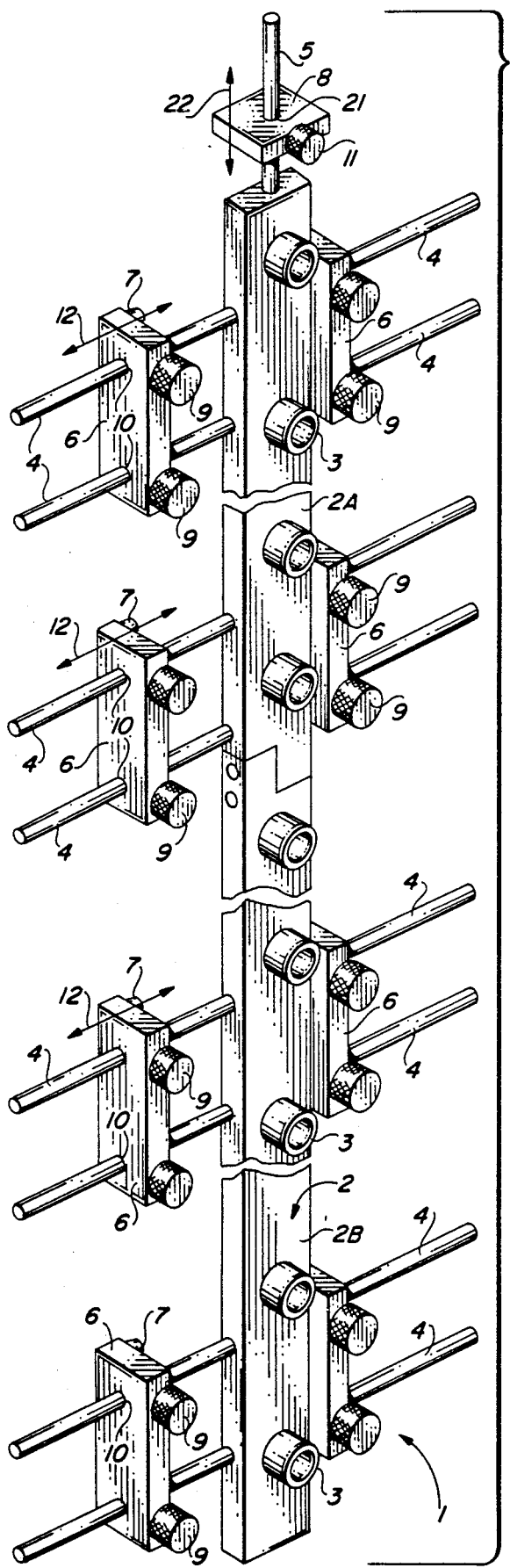
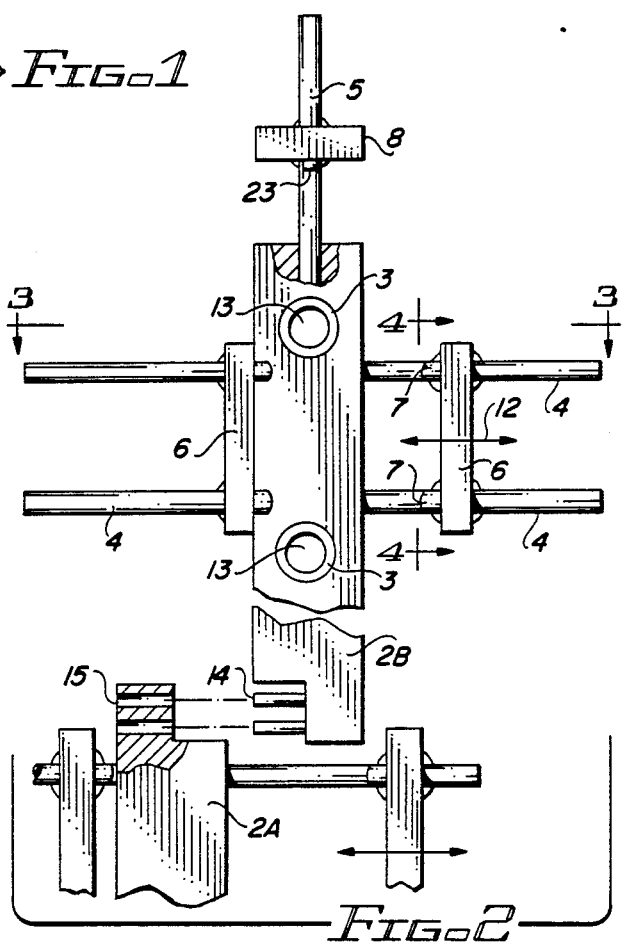
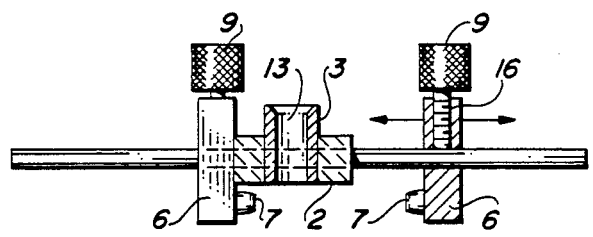
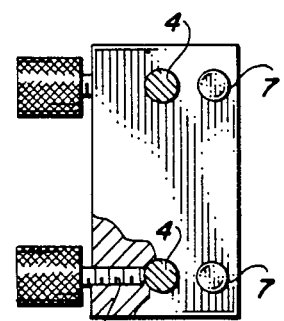

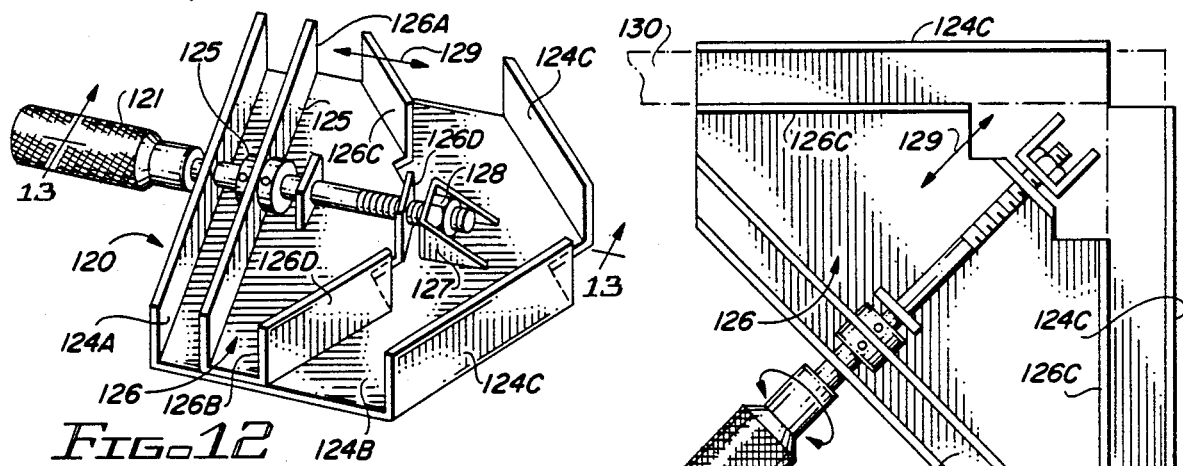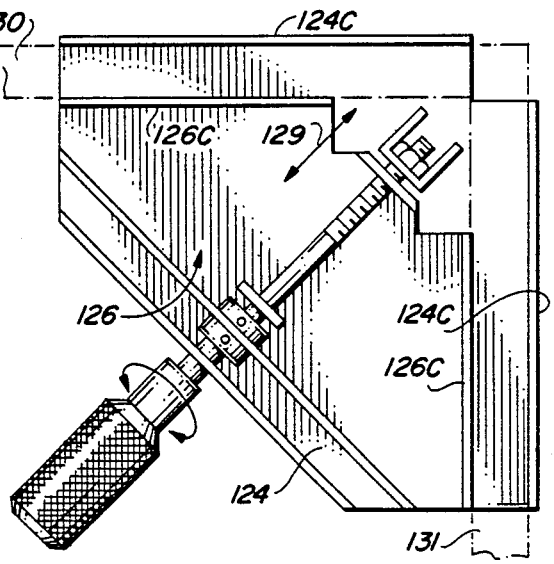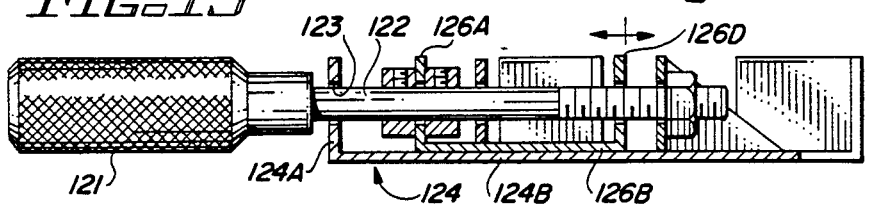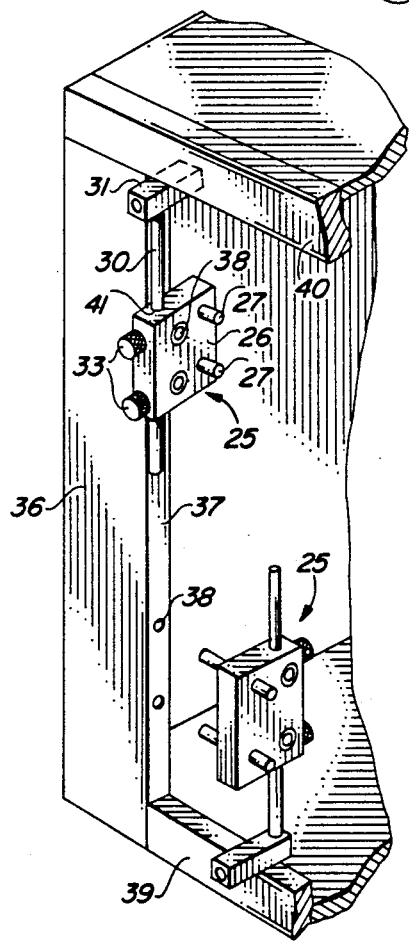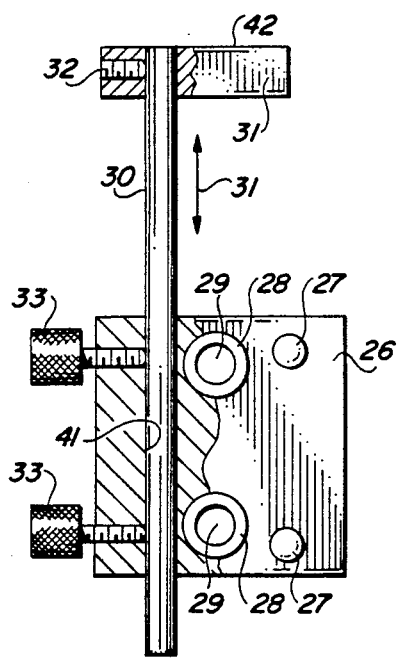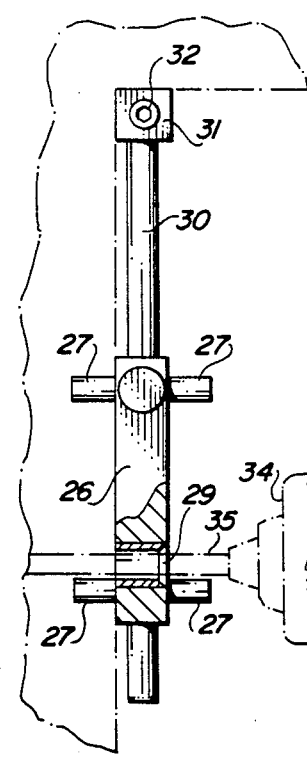

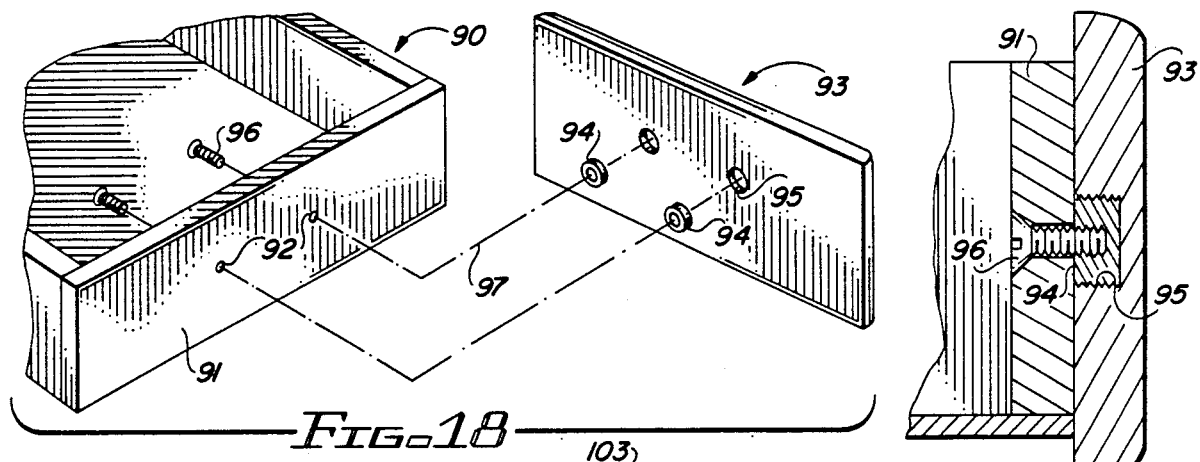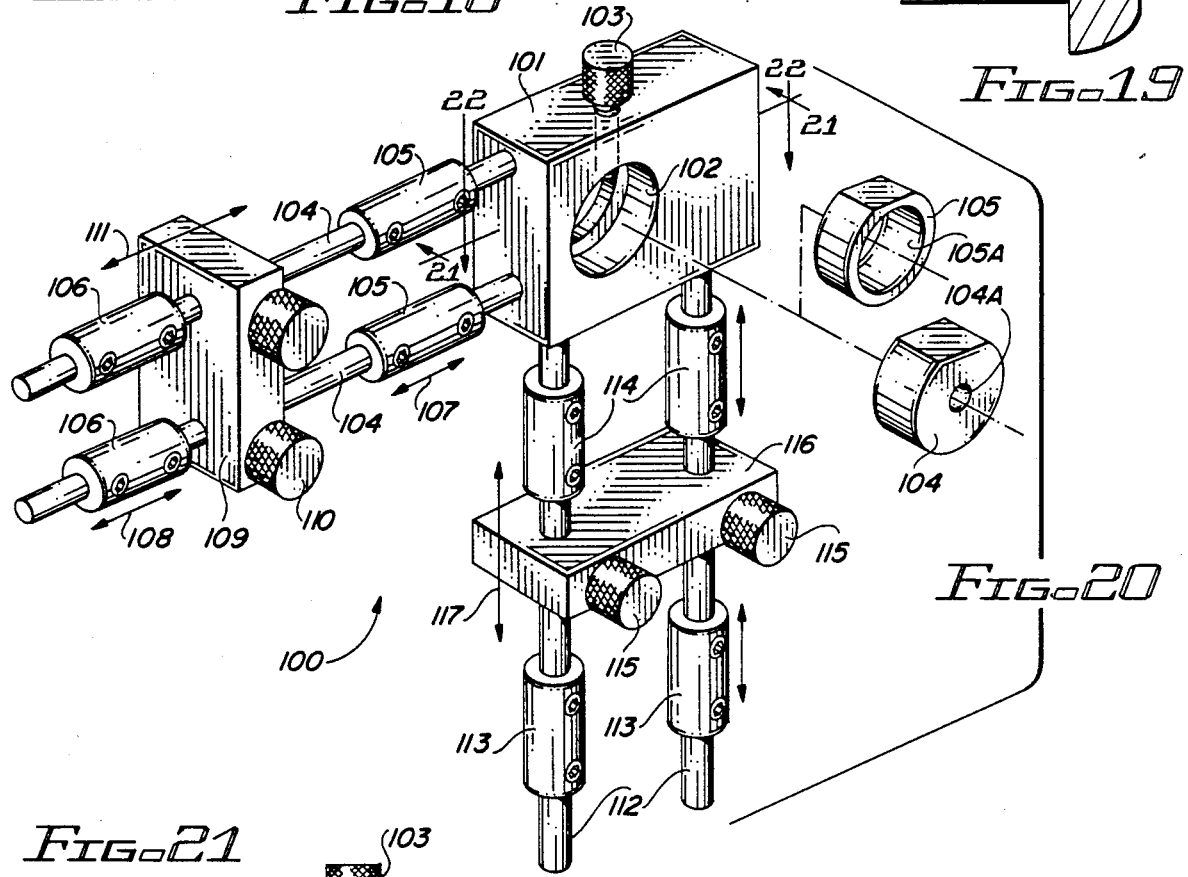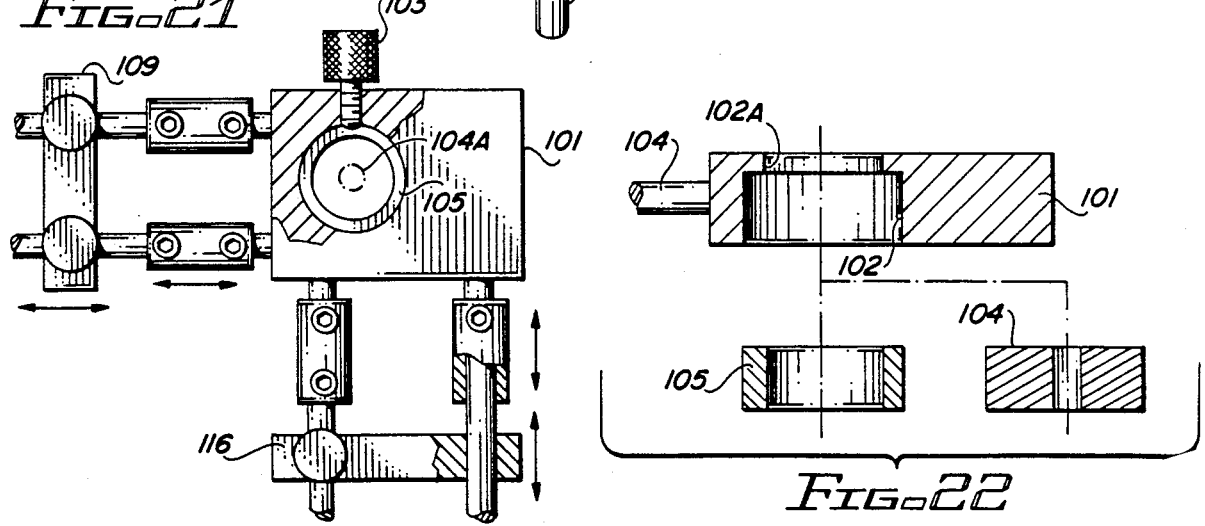

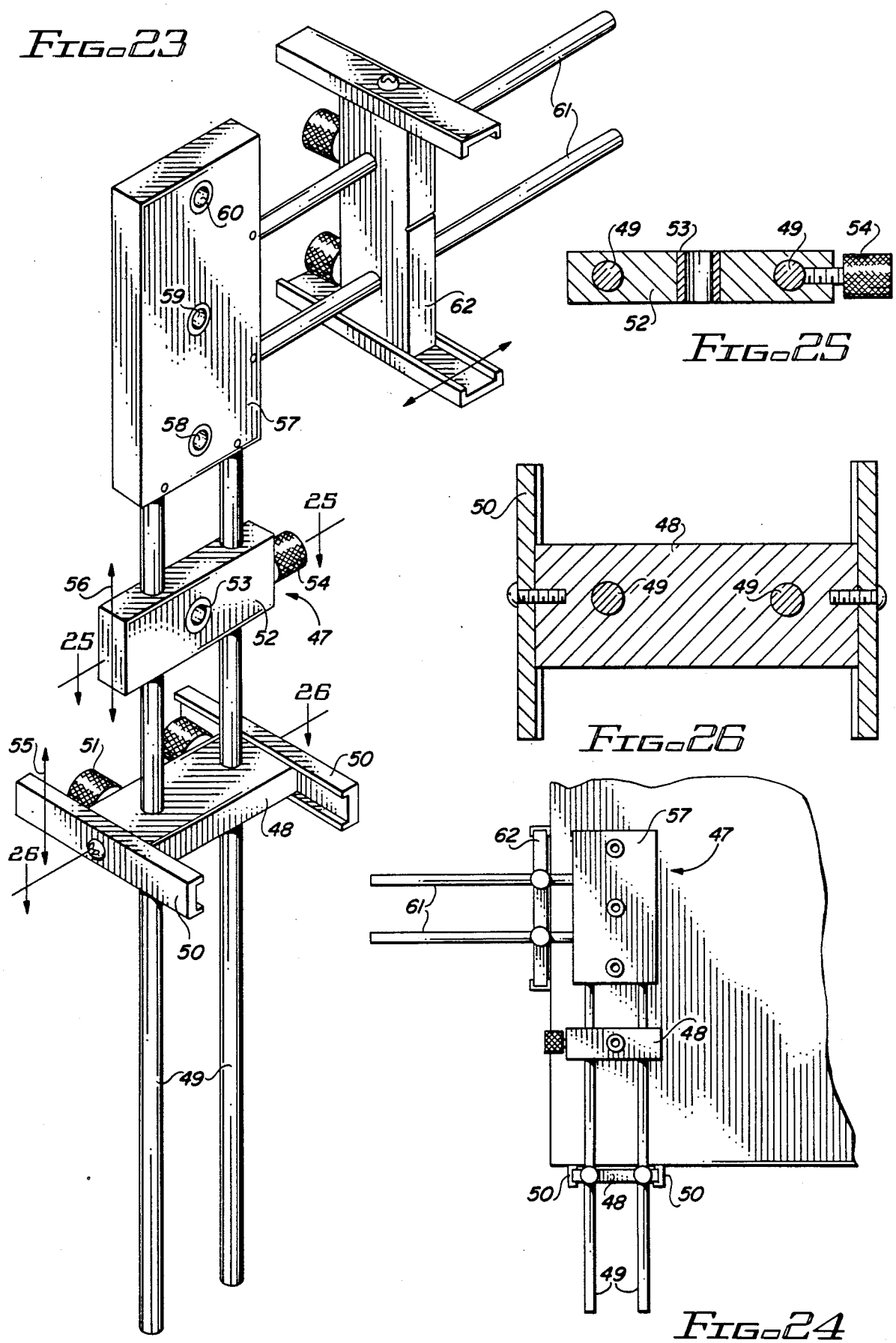

APPARATUS AND METHOD FOR ALIGNMENT OF DRILLING HOLES AND ASSEMBLY OF CABINETS

BACKGROUND OF THE INVENTION

The invention relates to various tools and techniques to facilitate economical manufacture of cabinets without elaborate, expensive jigging setups.

Economical manufacture of cabinets, such as typical cabinets for residential and business applications, requires extensive use of "mass production" techniques. Large, expensive "jig" setups and dedicated tools must be used to perform tasks including accurate alignment and drilling of construction holes for vertical and horizontal cabinet parts. The construction holes include those for edges of cabinet doors and cabinet housings for hinges, latches, handles, and knobs, drilling of precisely located holes in edges of various panels used in construction of a cabinet for receiving glue and construction dowels, shelf pins, and the like, and drilling of holes in drawer boxes for attachment of drawer front panels thereto, and alignment and drilling of threaded inserts in the back surfaces of drawer front panels. While large volume cabinet manufacturers can amortize the high cost of such jig setups and the factory floor space required therefor over a large number of cabinets, most small cabinet shops that specialize in custom or semi-custom cabinet manufacture cannot provide permanent jig setups. Instead, smaller shops must orient their manufacturing activities toward relatively small lots. Consequently, frequent jig setups and repetitive measurement of location of construction holes, shelf pin holes, etc. are necessary. Such frequent setups and repetitive measurements are very time consuming and therefore costly. Furthermore, the likelihood of costly errors and consequent discarding of partially constructed units and material is greatly increased.

There is a presently unmet need for a group of alignment tools and techniques for drilling the above mentioned construction holes for assembly of cabinets to enable a relatively small cabinet shop to be able to avoid the need for frequent complex, costly jig setups and repetitive, time consuming measurements for alignment of construction holes in the manufacture of cabinets.

SUMMARY OF THE INVENTION

Accordingly, it is an object of the invention to provide an improved apparatus and method for alignment and drilling of construction holes for assembly of cabinets.

It is another object of the invention to provide an improved technique for construction of cabinets.

Briefly described, and in accordance with one embodiment thereof, the invention provides a jigging apparatus for providing rapid setup to drill construction holes, door handle holes, hinge holes, and drawer front panel attachment holes in construction of cabinets and the like without excessive jigging setup time. Several tools are described for quickly squaring up cabinet panels and clamping them together while the glue dries. In the described embodiment of the invention, each jigging device includes a rectangular block having opposed major surfaces and four edge surfaces, at least one elongated cylindrical rod extending from an edge surface parallel to the major surface and an adjustable stop disposed on the rod for aligning the rectangular block to an edge of a board used in construction of a cabinet. A plurality of drill guide bushings are disposed in and extend through the major faces of the rectangular block. A set screw or the like is provided for locking the stop in fixed relationship to the rectangular block carrying the drill guide bushings, and another stop is provided for aligning the rectangular block to a second edge of the board mutually perpendicular to the first edge. In one embodiment, the rectangular block is elongated, and a plurality of pairs of parallel cylindrical rods extend from opposite edge surfaces of the block. An adjustable stop is provided on each pair of such rods, respectively. This embodiment is useful in alignment and drilling of construction holes in an edge of a board. In another embodiment, the rectangular block has a generally square major surface. A single cylindrical rod extends slidably through a hole in the rectangular block, and the stop is attached to the end of the block. A pair of pegs perpendicular to the major surfaces of the rectangular block function as a stop that aligns a pair of guide bushings carried by the rectangular block with respect to a major face of a board used in construction of a cabinet. The end stop aligns the guide bushings relative to a frame defining a cabinet door opening. This embodiment of the invention is useful in rapidly aligning and drilling holes for cabinet door hinges in an edge of a board framing the opening for the cabinet doors. Another embodiment of the invention is useful for drilling screw holes for knobs or handles on cabinet drawers and drawer fronts, and includes a first pair of parallel cylindrical rods extending from one edge surface of the rectangular block and the second pair of parallel rods perpendicular to the first pair extending from another edge of the rectangular block. Slidable first and second stops are disposed on the two pairs of cylindrical rods, respectively. A slidable block is also disposed on one pair of rods, carrying another drill guide bushing. Another similar embodiment of the invention provides a pair of limit stops on each cylindrical rod between which the adjustable stops can be moved and locked into position for the purpose of aligning and drilling holes in both a rectangular drawer box and insert holes in a larger rectangular drawer front. A squaring device including a stationary base with a pair of mutually perpendicular clamp faces and a moveable member with a pair of mutually perpendicular clamp faces and a rotatable handle connected to a jackscrew is utilized to square up a partially constructed cabinet housing. A clamping device includes a pair of end clamp plates and an elastic band adjustably connecting the clamp plates. This device is used instead of a conventional jackscrew-type of clamp.

BRIEF DESCRIPTION OF THE DRAWINGS

FIG. 1 is a partial perspective view of an adjustable drill guide for use in alignment of construction holes in vertical and horizontal cabinet parts.

FIG. 2 is a partial front elevation view of the alignment tool of FIG. 1.

FIG. 3 is a section view along section line 3—3 of FIG. 2.

FIG. 4 is a section view along section line 4—4 of FIG. 2.

FIG. 12 is a perspective view of a corner bracket for use in conjunction with the strap of FIG. 9.

FIG. 13 is a section view along section line 13—13 of FIG. 12.

FIG. 14 is a plan view illustrating use of the clamp of FIG. 12.

FIG. 15 is a partial perspective view illustrating use of another alignment tool in accordance with the present invention.

FIG. 16 is a plan view of the alignment tool shown in FIG. 15.

FIG. 17 is a front view of the alignment tool shown in FIG. 15.

FIG. 18 is a partial perspective view useful in describing attachment of a drawer front panel to a drawer box.

FIG. 19 is a partial section view illustrating a completed attachment of a drawer front panel to the front end of a drawer box.

FIG. 20 is a perspective view of an alignment tool useful in drilling the holes required in the assembly shown in FIG. 18.

FIG. 21 is a section view taken along section line 21—21 of FIG. 20.

FIG. 22 is a partial section view taken along section line 22—22 of FIG. 20.

FIG. 23 is a perspective view of another alignment tool in accordance with the present invention.

FIG. 24 is a plan view illustrating use of the alignment tool of FIG. 23.

FIG. 25 is a section view taken along section line 25—25 of FIG. 23.

FIG. 26 is a section view taken along section line 26—26 of FIG. 23.

DETAILED DESCRIPTION OF THE PREFERRED EMBODIMENTS OF THE INVENTION

Figure 5:
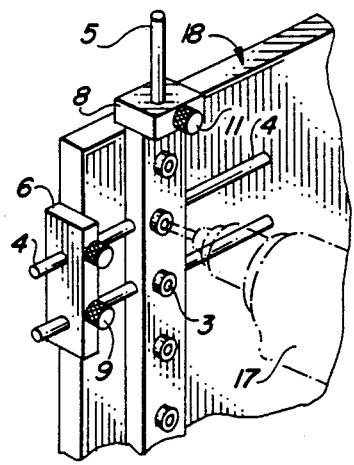
FIGS. 5–8 are partial perspective views useful in illustrating use of the alignment tool of FIG. 5.

Referring now to FIGS. 1-4, drill guide 1 includes an elongated, rectangular aluminum member 2 having a number of eight millimeter drill bushings 3 press fit into corresponding holes in member 2. Each of the drill bushings 3 has an 8 millimeter hole therein extending therethrough. The axis of each bushing hole 13 is perpendicular to the plane of the major parallel opposite surfaces of member 2.

A plurality of pairs of equally spaced steel rods 4 extend through member 2 parallel to its opposed front and rear surfaces, perpendicular to the left and right faces of member 2 as shown in FIG. 1, and perpendicular to the vertical longitudinal axis of member 2. Each of the rods 4 is one fourth of an inch in diameter. A cylindrical steel rod 5 extends from the top surface of member 2 parallel to the vertical axis of member 2.

Two side stops 6 are slideably mounted on each pair of cylindrical rods 4. Each side stop 6 includes a rectangular body having two holes 10 therein perpendicular to the major opposed surfaces of the body, so each side stop 6 can slide away from or toward member 2 on the rods 4. A pair of knobs 9 is provided on the front edge of each of the side stops 6. Each knob 9 has a knurled handle and is attached to a threaded stud, designated by numeral 16 in FIGS. 3 and 4, which mates with a corresponding threaded hole extending into the front edge of the body of that stop all the way to the rods 4 in the respective holes 10. Tightening of each knob 19 locks the side stop 6 into a fixed position on its rods 4.

A pair of plastic bumpers 7 is attached to the inner rear edge surface of each stop 6, as shown in FIGS. 2, 3, and 4. Each stop extends three sixteenths of an inch beyond the inner surface of the body of that stop.

Similarly, a square top stop 8 having a hole 21 centered in and perpendicular to the opposed upper and lower surfaces thereof slides on rod 8. A knob 11 similar to knobs 9 allows top stop 8 to be locked into position after it has been moved in the direction of arrows 22. Top stop 8 has a plastic bumper 23 similar to bumper 7 on its lower major surface along the edge opposite to knob 11, as shown in FIG. 2.

As shown in FIG. 3, each of the drill bushings 3 has a tapered mouth to facilitate insertion of a close fitting bit of an electric drill, extends through member 2, and is flush with the back surface thereof. Each of the bushings 3 is three fourths of an inch long. The width of member 2 is one inch, and its thickness is three eighths of an inch. Member 2 and the side and top stops can be anodized aluminum. The rods 4 and 5 can be stainless steel.

As indicated in FIG. 2, member 2 can include an upper section 2A and lower section 2B which can be separated or can be connected together by a precision fit of two cylindrical pins 14 extending into corresponding holes 15, as illustrated.

Figure 6:
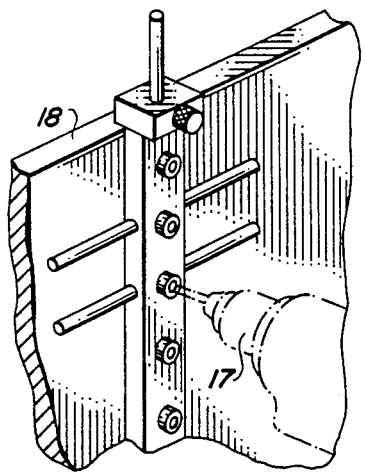
Figure 7:
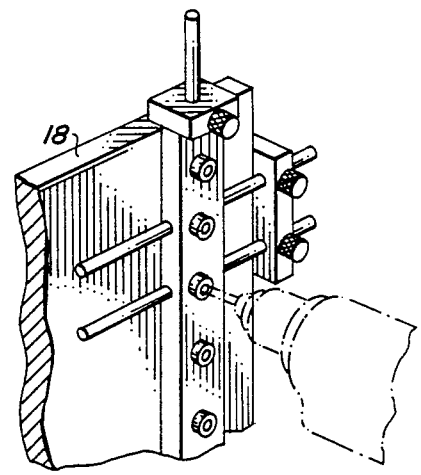

FIGS. 5-7 show several different ways of utilizing the drill guide 1. In FIG. 5, the side stops on the right hand pairs of rods 4 have been removed. Top stop 8 has been positioned to align the guide bushings 3 a desired distance from the top edge of panel 18. The left hand side stop 6 have been positioned on their corresponding rods 9 and locked into place by means of knobs 9 so that the guide bushings 3 are precisely positioned a selected distance from the left hand vertical edge of panel 18. An electric drill 17 having a 5 millimeter size drill bit then can quickly and precisely drill suitable holes into the front face of panel 18. The drilled holes could be, for example, shelf pin holes. FIG. 7 shows how corresponding rear shelf pin holes could be drilled a precisely measured distance from the right hand edge of panel 18 by performing the same operation, except the left hand stops 6 have been removed from the right hand rods 4, and the left hand stops have been appropriately locked into place on the corresponding right hand rods 4.

FIG. 6 shows how intermediate holes could be positioned selected distances from the top edge of panel 18 by removing both the left and front edge stops.

Figure 8:
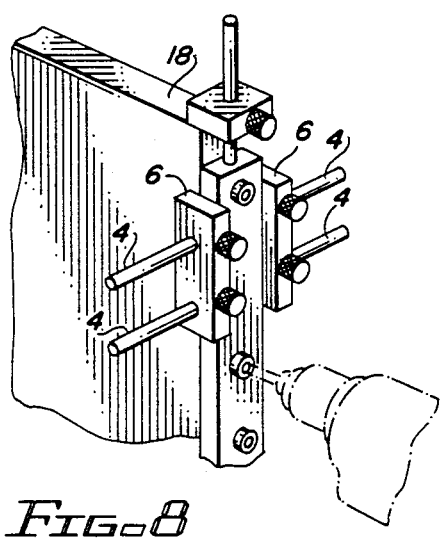

FIG. 8 shows how the drill guide 1 can be utilized to drill precisely aligned and spaced construction holes in the edge of panel 18. In this case, both the left hand side stops 6 and the right hand side stops 6 remain on the corresponding right bars 4 and left bars 4. The length of bumpers 7 is such that when side stops 6 are pressed against the side edges of member 2, drill guide 1 fits precisely against the vertical edge of panel 18, with the bumpers 7 touching the opposite major faces of panel 18 so the holes drilled through guide bushings 3 are precisely centered in the vertical edge of panel 18. The panel 18 is five eighths of an inch thick.

Referring next to FIGS. 15-17, another similar drill guide 25 is specially adapted for drilling holes such as 38 for fastening hinges to the inner edge 37 of a frame member 36 of a frame type cabinet, so that a cabinet door can be attached thereto. Two pairs of hinge holes 38 must be provided equally distant from the bottom and top frame members 39 and 40 on the inner edge 38.

Drill guide 25 includes a square anodized aluminum body member 27 having a pair of guide bushings 28 therein, each extending through member 26 so that it is flush with the opposite major faces thereof, as best seen in FIG. 17. A guide hole 29 through each guide bushing 28 typically is 7/64 of an inch or 5 millimeters in diameter. A pair of steel cylindrical pegs 27 extends perpendicularly to the main opposed major faces of member 26, as indicated in FIG. 17. Each peg 27 extends five sixteenths of an inch beyond the corresponding major surface of member 26. The distance between pegs 27 and the centers of guide bushings 28 is such that when the pegs 27 press against a major inner or outer face of frame member 36 the drill guide holes 29 are precisely centered between the opposite parallel major faces of frame member 36.

An end stop 31 is attached to the upper end of a cylindrical steel rod 30 which extends through a hole 41 passing through member 26.

Locking knobs 33 each having a threaded stud can be extended into a threaded hole in the left edge of member 26 to lock member 26 in place on rod 30 after member 26 has been moved, in the direction of one of arrows 31 to a selected distance from the upper surface 42 of end stop 31. Then, the lower pair of hinge holes 38 and a corresponding upper pair can be drilled in edge 37 by first positioning the drill guide 25 in the manner shown in the lower portion of FIG. 15, inserting the drill guide 25, positioning it as shown in FIG. 15, and drilling the upper pair of hinge holes.

Next, another embodiment of the invention is shown in FIGS. 23-26, wherein drill guide 47 is specially adapted to drill holes for cabinet door handles and knobs. Drill guide 47 includes a bottom stop 48 slideably mounted on a pair of vertical cylindrical steel rods 49. The position of bottom stop 48 on rods 49 can be adjusted in the direction of arrows 55. Bottom stop 48 can be locked in place by tightening lock knobs 51. Two horizontal bars 50 are attached to the ends of rectangular bottom stop 48 to engage the bottom edge of a cabinet door 64, as shown in FIG. 24.

A rectangular anodized aluminum member 52 is slideably disposed on vertical rods 49, adjustable in the directions indicated by arrows 56. Member 52 can be locked in place on rods 49 by means of locking knob 54. A guide bushing 53 is perpendicular to the parallel front and rear surfaces of member 52 and is flush therewith, as indicated in FIG. 25. The upper ends of vertical rods 49 are rigidly attached to a lower edge of a rectangular corner member 57, which carries three spaced guide bushings 58, 59, and 60. The diameters and locations of guide bushings 58, 59, and 60 correspond to the spacings and diameters needed for conventional cabinet handles.

A pair of horizontal rods 61 are rigidly attached to the right edge of corner member 57, and a side stop 62 similar to bottom stop 48 is slideably positioned on horizontal rod 61.

One way of using drill guide 47 is shown in FIG. 24, wherein the locations of stops 62 and 48 are selected to position member 57 and/or member 48 so that holes can be drilled to attach a single knob or a conventional handle to the front surface of cabinet door 64. A way of using drill guide 47 to accurately drill handle holes in a drawer front is to set the position of stop 48 to center corner block 57 relative to the side edges of the drawer front and to set the position of stop 62 to center corner block 57 relative to the top and bottom edges. Then bushing 59 can be used to drill a single guide hole for a knob, or bushings 58 and 60 can be used to drill holes for a two screw handle.

Next, a simple clamping system is described with reference to FIGS. 9-11 to temporarily clamp panels of a cabinet together until the glue dries. FIGS. 12-14 illustrate an adjustable cabinet squaring device which can be utilized in conjunction with the strap clamps of FIGS. 9-11.

Figure 9:
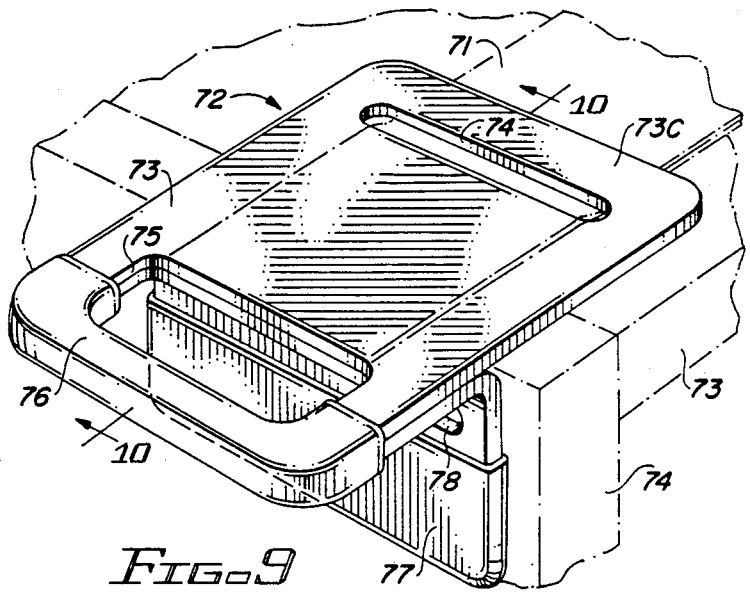
FIG. 9 is a perspective view illustrating a clamping mechanism used in assembly of cabinets in accordance with the invention.
Figure 10:
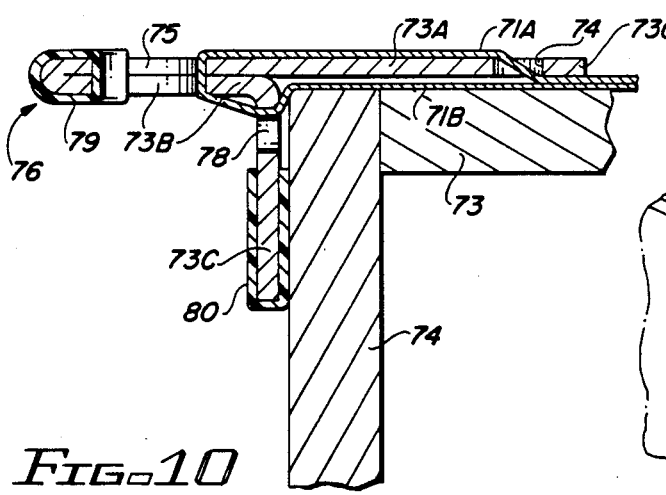
FIG. 10 is a section view along section line 10—10 of FIG. 9.
Figure 11:
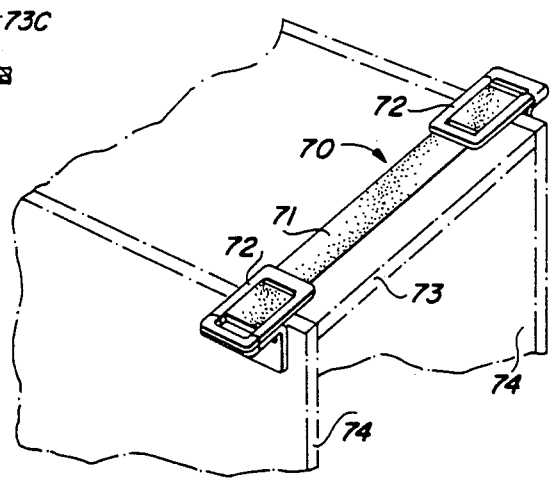
FIG. 11 is a partial perspective view illustrating use of the clamping strap of FIG. 9.

Referring now to FIGS. 9-11, clamp strap 70 (FIG. 11) includes an elastic strap 71 stretched between two clamp members 72 to effectively force two end panels 74 against the edges of a top panel 73 to provide a tight clamping action until glue dries during assembly of a cabinet. Thus, the clamping device 70 performs the function of prior jackscrew-type mechanical clamps or the like.

As best shown in FIGS. 9 and 10, each clamp member 72 includes a steel plate 73 having a top section 73A with a slot 74 in its inner end. Clamp member 72 also has a handle aperture 75 for accommodating the fingers of a person who grips handle 76. Handle 76 is formed by a back-folded portion 73B of plate 73, through which handle opening 75 extends. A conventional rubberized layer 79 is formed over and around handle 76. The steel plate 72 also includes a folded down portion 73C having an aperture 78 therein and a rubberized layer 80 thereon to avoid damage to the left surface of end panel 74. Strap 71 extends along the upper surface of top panel 73, protecting it from the contact with the lower surface of clamp member 72, passes through hole 78, handle hole 75, and then passes back along the upper surface of plate 73, through slot 74 and underneath the inner end portion 73C to thereby prevent slippage of strap 71 when it is tightly stretched to provide the clamping function. The device 70 is easily adjustable to any suitable length, and is more easily utilized and stored than conventional cabinet clamps.

FIGS. 12-14 illustrate a squaring device that can be used in conjunction with the clamping system of FIGS. 9-11. Squaring device 120 has a rotatable handle 121 having an axial shaft 22 extending through a clearance hole 23 of a vertical plate 24A of a stationary clamp member 124. Stationary member 124 has a flat bottom section 124B attached to the bottom edge of plate 124A and a pair of vertical clamp plates 124C spaced from each other. Bottom plate 124B and vertical clamp plates 124C are mutually perpendicular.

Rod 122 also extends through a clearance hole in a vertical rear plate 126A of a moveable clamp member 126 having a bottom plate 126B. Two collars 125 attached to shaft 122 on either side of plate 126A and cause moveable clamp element 126 to move in the direction of arrows 129 relative to stationary clamp member 124 as handle 121 is rotated, because the right end of shaft 122 is threaded into a stationary nut 128 supported in fixed relationship to stationary bottom plate 124B by a bracket 127. A bracket 126D attached to the bottom plate 126B keeps moveable clamp member 126 properly aligned with stationary clamp member 124. Spaced plates 126C are attached to bottom plate and are mutually perpendicular with each other end bottom plate 126B.

The utilization of the squaring tool 120 is illustrated in FIG. 14, wherein dashed lines 130 designate an edge of a cabinet panel which is to be attached in perpendicular relationship to another panel 131. By rotating handle 121, the moveable clamp member 126 can be tightened against the inner faces of the panels 130 and 131, clamping panel 130 into perpendicular relationship with panel 131.

Referring next to FIGS. 18–22, another drill guide is shown which is especially adapted to attaching front panels to drawers used in making of cabinets. Before describing this drill guide, it will be helpful to refer to FIGS. 18 and 19 to understand its purpose. Numeral 90 designates a typical drawer box having a front wall 91. A drawer front panel 93 is to be attached to front wall 91 of drawer box 90. The height and width of front panel 93 is greater than that of front wall 91, so front panel 93 should be attached so that it is symmetrically positioned on front wall 91. To this end, screw holes 92 need to be precisely aligned with threaded inserts 94 that are press fit into shallow predrilled holes 95 in the inner face of drawer front panel 93, as shown in FIG. 19. Then the front panel 93 can be attached by simply inserting screws 96 through holes 92 and screwing them into threaded holes in inserts 94. The problem is how to quickly position and drill the holes 92 and 95. The drill guide 100 of FIGS. 20–22 enables this to be done quickly and easily.

Drill guide 100 includes a corner block 101 having a cylindrical hole 102 one inch in diameter for receiving either a guide bushing 118 having a precisely centered hole 118A three sixteenths of an inch in diameter for the purpose of drilling screw holes 92 or a bushing 119 having therein a 20 millimeter inch diameter hole 119A for the purpose of drilling the insert holes 95. A lock screw 103 engages the flat of either bushing 104 or 105 to securely lock it in place in block 101.

A pair of parallel horizontal cylindrical rods 104 extend vertically outward from the left hand edge of rectangular block 101. A pair of cylindrical adjustable stops 105 are disposed on rods 104 and are locked into place by means of the illustrated set screws. The side stop 109 very similar to the side stops previously described in FIG. 1 herein is slideably disposed on rods 104, and can be locked into a selected position either against cylindrical stops 105 or 106. Cylindrical stops 106 are positioned on rods 104 to the left of side stop 109. Similarly, a pair of parallel vertical rods 112 extend from the bottom edge of rectangular block 101. A slideable bottom stop 116, which can be locked into place by means of knobs 115, is disposed between two stationary pairs of cylindrical stops 113 and 114.

The cylindrical stops 105, 106, 113, and 114 are positioned and locked so that when side stop 109 abuts cylindrical stops 105 and bottom stop 116 abuts cylindrical stops 114, and guide bushing 118 is secured into hole 102 by locking knob 103, screw holes 92 can be drilled by abutting the inner and upper faces of stops 109 and 116 against the side and bottom edges, respectively, of front wall 91 of door box 90. Then, to drill insert holes 95 in the back surface of drawer front panel 93, guide bushing 118 is removed and replaced by guide bushing 119. Side stop 109 is moved against cylindrical stops 106, and bottom stop 116 is positioned against cylindrical stops 113. When the inner faces of stops 109 and 116 are then abutted to the side and bottom edges of drawer front panel 93, the two shallow insert holes 95 can be accurately drilled.

The above described collection of alignment tools, the clamping tool and the scoring tool provide a collection of tools that make it possible for a small cabinet shop to quickly manufacture a small "lot" of cabinets without an excessive amount of measuring and remeasuring of the locations of construction holes and the like, without use of large amount of jig equipment, floor space, and facilitates to effectuate rapid manufacture and assembly of predrilled panels and the like.

While the invention has been described with reference to a particular embodiment thereof, those skilled in the art will be able to make various modifications to the described embodiments without departing from the true spirit and scope thereof.

What is claimed is:

1. A jigging apparatus for drilling holes in boards for construction of a cabinet, comprising in combination:
    (a) a substantially elongated rectangular block having first and second opposed major surfaces and right and left edge surfaces and an end surfce;
    (b) a plurality of pairs of smooth-surfaced cylindrical rods defining portions extending perpendicularly from the left and right edge surfaces and parallel to the major surfaces;
    (c) a first plurality of adjustable stop means slidably longitudinally disposed on the pairs of smooth-surfaced cylindrical rod portions extending from the left edge surface and a second plurality of adjustable stop means slidably longitudinally disposed on the pairs of smooth-surfaced cylindrical rod portions extending from the right edge surface, respectively, for aligning the rectangular block to opposite parallel faces of a board;
    (d) a plurality of drill guide bushings aligned along a longitudinal center axis of the rectangular block and mounted in and extending through the major surfaces to provide drill guide holes perpendicular to the major surfaces;
    (e) means for locking each of the stop means in fixed relationship to the rectangular block;
    (f) a smooth-surfaced rod extending from the end surface of the rectangular block and aligned with the longitudinal center axis, there being no similar rod extending from an opposite end surface of the rectangular block;
    (g) an end stop means slidable on the smooth-surfaced rod for aligning the rectangular block to the end surface;
    (h) means for locking the end stop means in fixed relationship to the rectangular block.

2. A jigging apparatus for drilling holes in boards for construction of a cabinet, comprising in combination:
    (a) a first rectangular block having first and second opposed major surfaces and first, second, third, and fourth edge surfaces;
    (b) a first pair of smooth-surfaced cylindrical rods extending perpendicularly from the first edge surface and parallel to the major surfaces;
    (c) a second pair of smooth-surfaced cylindrical rods extending perpendicularly from the second edge surface and parallel to the major surfaces, the second edge surface being perpendicular to the first edge surface;
    (d) an adjustable first stop means slidable on the first pair of smooth-surfaced cylindrical rods for aligning the first rectangular block to a first edge surface of a board;
    (e) first means for locking the first stop means on the first pair of smooth-surfaced cylindrical rods in fixed relationship to the rectangular block;
    (f) an adjustable second stop means slideable on the second pair of smooth-surfaced cylindrical rods for aligning the first rectangular block to a second edge surface of the board, the first edge surface of the board being perpendicular to the second edge surface of the board;

(g) second means for locking the second stop means on the second pair of smooth-surfaced cylindrical rods in fixed relationship to the rectangular block;

(h) a plurality of drill guide bushings aligned along a longitudinal center of the first block and mounted in and extending through the major surfaces to provide drill guide holes perpendicular to the first pair of smooth-surfaced cylindrical rods and parallel and centrally located between the second pair of smooth-surfaced cylindrical rods;

(i) a second rectangular block, having first and second opposed major surfaces, slidably disposed on the second pair of rods between the first rectangular block and the second stop means and carrying a drill guide bushing mounted in and extending through the first and second major surfaces of the second rectangular block to provide a drill guide hole perpendicular to the first and second major surfaces of the second rectangular block and aligned with the longitudinal center axis.

3. The jigging apparatus of claim 2 wherein the plurality of drill guide bushings includes a first drill guide bushing disposed midway between longitudinal axes of the first pair of smooth-surfaced cylindrical rods.

4. A jigging apparatus for drilling holes in boards for construction of a cabinet, comprising ian combination:
(a) a rectangular block having first and second opposed major surfaces and first, second, third, and fourth edge surfaces;
(b) elongated first and second rods extending through the rectangular block and extending perpendicularly outward from the first and second major surfaces;
(c) a hole parallel to the first and second opposed major surfaces extending from the first edge surface to the second edge surface, the first and second edge surfaces being parallel to each other and perpendicular to the first and second opposed major surfaces, and a smooth-surfaced rod slidable in the hole, an end portion of the smooth-surfaced extending outward from the hole;
(d) an abutment element disposed on the end portion of the smooth-surfaced rod;
(e) means for locking the smooth-surfaced rod in fixed relationship to the rectangular block;
(f) plurality of drill guide bushings mounted in and extending through the first and second opposed major surfaces to provided drill guide holes perpendicular to the first and second opposed major surfaces, the drill guide bushings being aligned along an axis parallel to a longitudinal axis of the hole, the first and second rods lying in a plane parallel to the longitudinal axis of the hole.

5. A jigging apparatus for drilling holes in boards for construction of a cabinet, comprising in combination:
(a) a rectangular block having first and second opposed major surfaces and first, second, third, and fourth edge surfaces;
(b) a first pair of smooth-surfaced cylindrical rods extending perpendicularly from the second edge surface and parallel to the major surfaces, the second edge surface being perpendicular to the first edge surface;
(d) an adjustable first stop means slidable on the first pair of smooth-surfaced cylindrical rods for aligning the first rectangular block to a first edge surface of a first board;
(e) first means for locking the first stop means on the first pair of smooth-surfaced cylindrical rods in fixed relationship to the rectangular block;
(f) first and second limit stop means disposed on the first pair of smooth-surfaced cylindrical rods, the first stop means being intermediate the first and second limit stop means to provide for setting first and second positions of the first stop means;
(g) an adjustable second stop means disposed on the second pair of smooth-surfaced cylindrical rods for aligning the first rectangular block to a second edge surface of a board, the first edge surface of the board being perpendicular to the second edge surface of the board;
(h) second means for locking the second stop means on the second pair of smooth-surfaced cylindrical rods in fixed relationship to the rectangular block;
(i) third and fourth limit stop means disposed on the second pair of smooth-surfaced cylindrical rods, the second stop means being intermediate the third and fourth limit stop means to provided for setting first and second positions of the second stop means;
(j) the rectangular block having a bushing receiving hole extending through the major surfaces and defining a longitudinal central axis, a first drill guide bushing received in said bushing receiving hole to provide a first drill guide hole, mean removably securing said first drill guide bushing to said rectangular block, and the first drill guide bushing being replaceable by a second drill guide bushing, alignable along the longitudinal center axis to provide a second drill guide hole aligned with the first drill guide hole and of larger diameter than the first drill guide hole.

* * * * *